March 15, 1927.

D. APPEL 1,621,049

PROCESS OF MAKING PAPER BAGS

Filed Sept. 18, 1924   7 Sheets-Sheet 2

Inventor
Daniel Appel.

March 15, 1927. 1,621,049
D. APPEL
PROCESS OF MAKING PAPER BAGS
Filed Sept. 18, 1924   7 Sheets-Sheet 4

Inventor
Daniel Appel

Attys.

March 15, 1927.  1,621,049

D. APPEL

PROCESS OF MAKING PAPER BAGS

Filed Sept. 18, 1924  7 Sheets-Sheet 6

Inventor
Daniel Appel.

March 15, 1927.
D. APPEL
1,621,049

PROCESS OF MAKING PAPER BAGS

Filed Sept. 18, 1924    7 Sheets-Sheet 7

Inventor
Daniel Appel.

Attys.

Patented Mar. 15, 1927.

1,621,049

UNITED STATES PATENT OFFICE.

DANIEL APPEL, OF CLEVELAND, OHIO, ASSIGNOR TO THE CLEVELAND-AKRON BAG COMPANY, OF CLEVELAND, OHIO, A CORPORATION.

PROCESS OF MAKING PAPER BAGS.

Application filed September 18, 1924. Serial No. 738,536.

My invention pertains to an improvement in a process of making paper bags rapidly and economically, for example a paper bag having a square bottom such as disclosed and claimed in my Letters Patent of the United States, No. 1,484,383, dated Feb. 19, 1924, and my general object is embraced in the different steps of the process substantially as hereinafter described and more particularly pointed out in the claims, and which steps are co-ordinated and involve, first, slitting of a sheet of paper at spaced intervals as it is being rapidly unrolled; second, forming of a plicated tube from the slitted sheet of paper with the slits on the fold lines of the tube; third, incising of the slitted tube and the forming of triangular folds and a partially developed flat bottom successively at intervals in the tube without severing the developed sections completely from each other while the tube is traveling at high speed; fourth, final pasting and folding of each developed bag bottom substantially contemporaneously with the severing of a completed bag section from the tube; and fifth, unfolding and flattening of the bag to facilitate packing and shipment.

The accompanying drawings are illustrative of the different steps taken to produce the bags, in which.

In practicing this process, the first steps taken to produce a finished bag involve the cutting and slitting of a sheet of paper P prior to the formation of a plicated tube T to permit other progressive steps to be taken subsequently to produce a diamond fold or triangular folds F and a flat bottom in a series of bag sections rapidly and without malfunction. These operations are also carried on without completely severing the successive tubular bag sections from each other until final sealing of the bottom flaps F' and F² for each bag is to be effected. Thus, in operations the tube is incised transversely at uniformly spaced intervals to provide bags of a given length, the incisions 4 extending inwardly from each longitudinal side edge of the tube a predetermined distance so that each bag section is only partly severed from the next and a narrow strip 5 will connect the successive sections. In this way a sub-divided tube of connected sections may be drawn through the machine by a pull applied longitudinally of all the connected sections while the bottom for each bag section is being developed in a progressive and rapid manner without undue strain on the paper.

Figure 1:
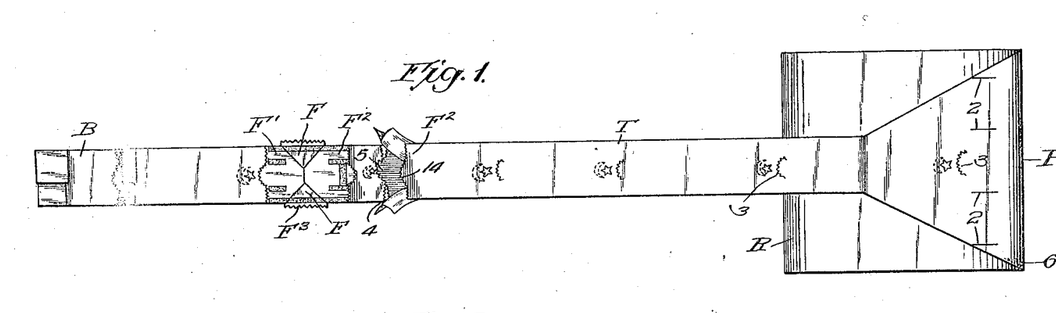
Fig. 1 is a plan view, on a reduced scale, of the paper as it appears in one stage of operations in the development of a tube and a bag.
Figures 2, 3, 4:
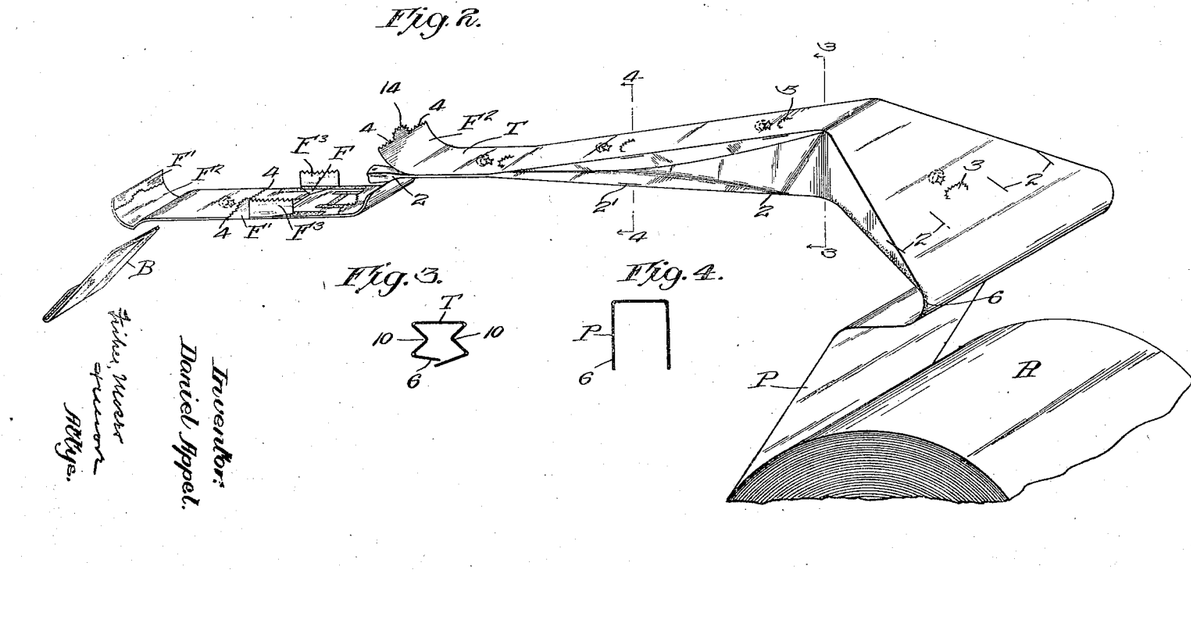
Fig. 2 is a perspective view thereof.
Figs. 3 and 4 are cross sectional views on lines 3—3 and 4—4 respectively, of Fig. 2.
Figure 5:
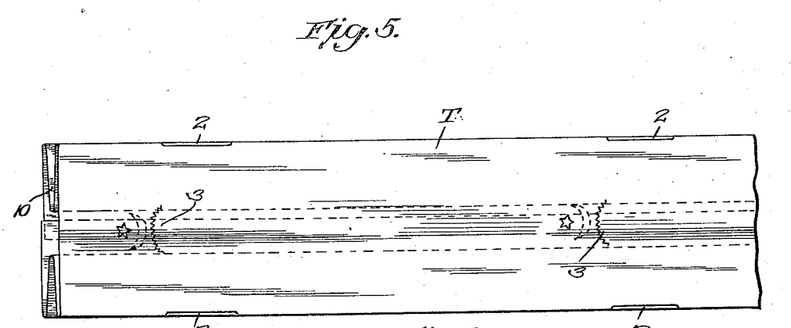
Fig. 5 is a plan view of a part of the plicated tube as it appears immediately subsequent to its development from the slitted sheet of paper.
Figure 6:
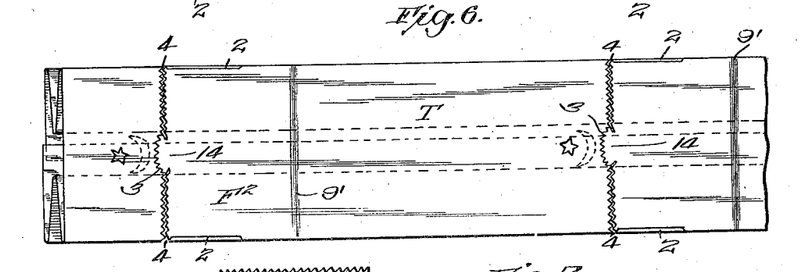
Fig. 6 is a plan view of the same part incised and creased.
Figure 7:
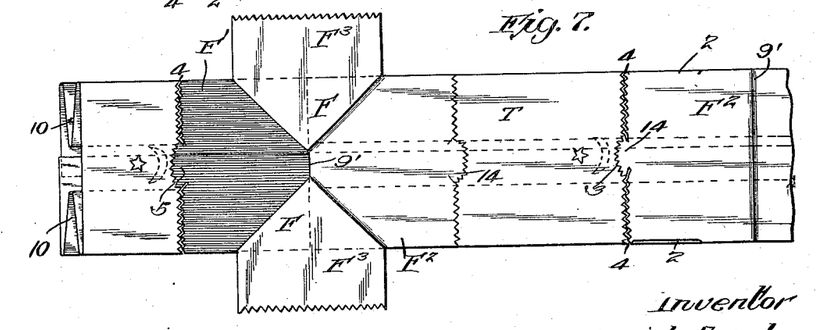
Fig. 7 illustrates the next step involving the formation triangular folds and laterally extending tabs.
Figure 8:
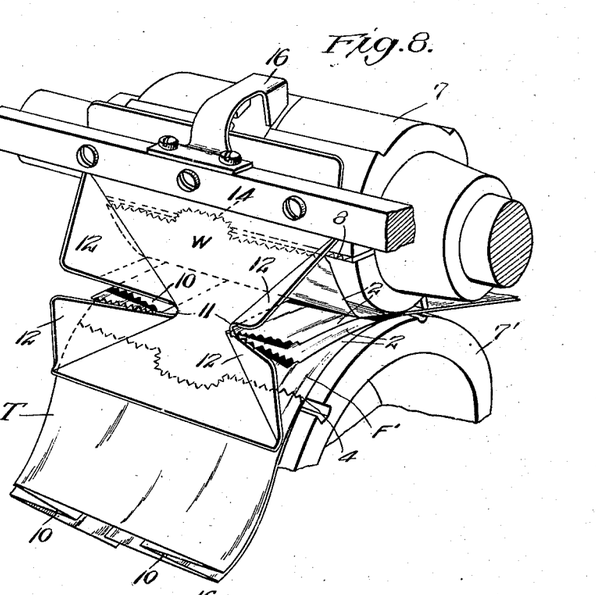
Fig. 8 is a perspective view of the incised and slitted part of the tube passing through a pair of rolls and a wiping plate, and showing the initial stages of unfoldment of the bag bottom.
Figure 9:
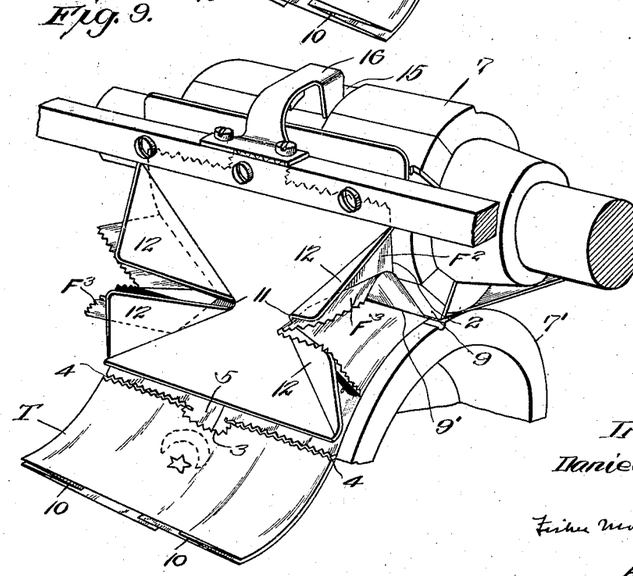
Figs. 9, 10 and 11, are perspective views corresponding to Fig. 8, showing successive stages of development of the triangular folds of the bag bottom.
Figure 10:
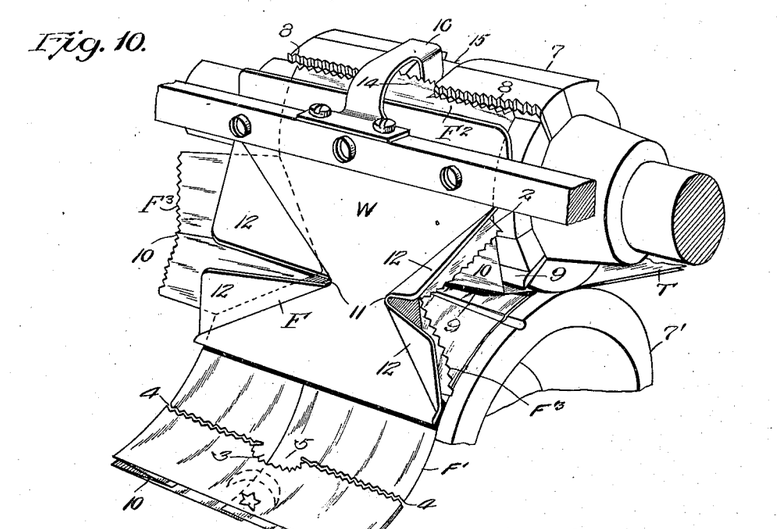
Figure 11:
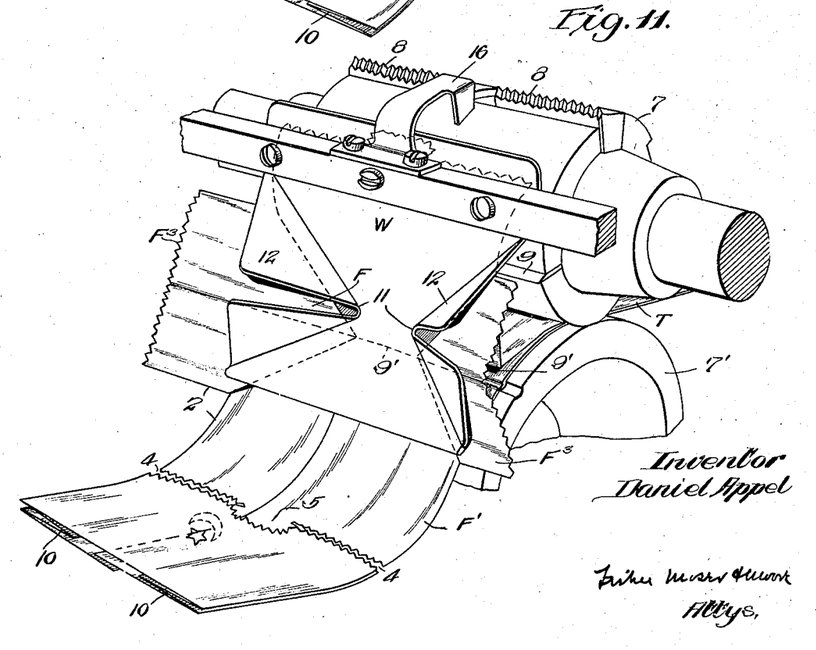
Figure 12:
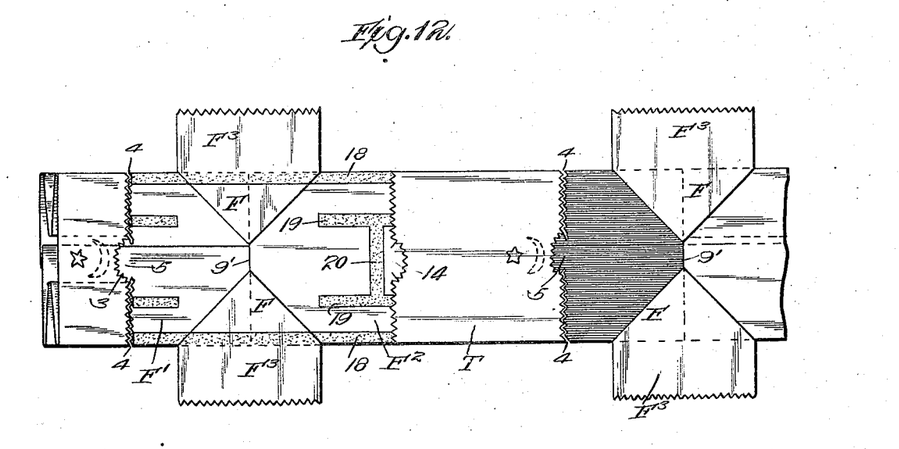
Fig. 12 is a plan view of a short length of the plicated tube showing the unfolded parts as they appear in the next step when pasted.
Figure 13:
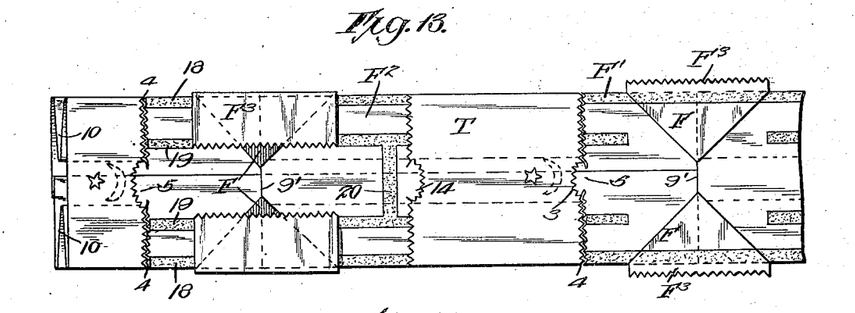
Fig. 13 is a plan view, illustrative of the next step when the lateral tabs or flaps are folded inward upon the pasted faces.
Figure 14:
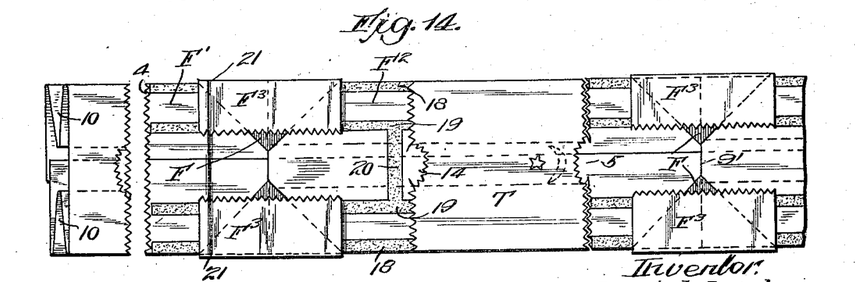
Fig. 14 is a similar view of the next step showing a part of a bag section completely severed from the tube and the unfolded end part of the tube creased transversely near one straight edge of the inturned flaps.
Figure 15:
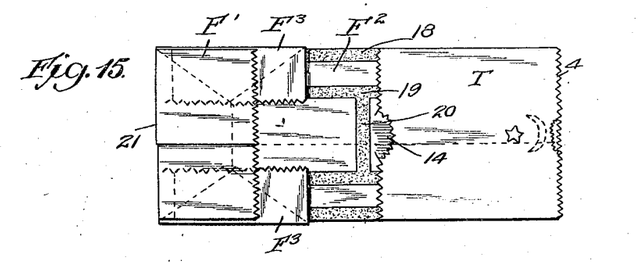
Fig. 15 delineates the next step and is a plan view of a severed bag section with one end flap folded downward upon the inturned flaps and with the other end flap still open and lying flat upon the body of the bag.
Figure 16:
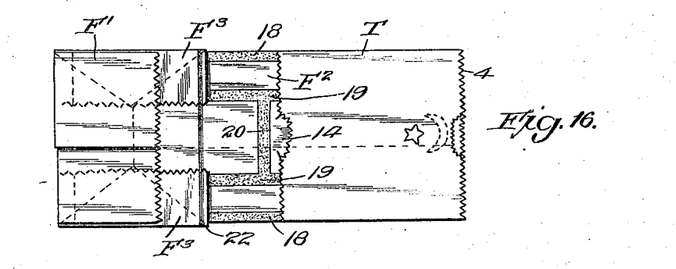
Fig. 16 is a plan view corresponding to Fig. 15 and disclosing the step of creasing the tube across the exposed part of the inturned flaps adjacent the marginal straight edges thereof.
Figure 17:
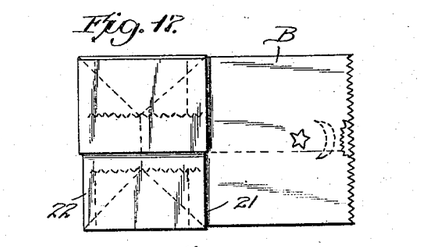
Fig. 17 is a plan view of the folded bag section, illustrating the finishing step of doubling the entire bag bottom upon the main body of the bag to effect pasting of the final fold.
Figure 18:
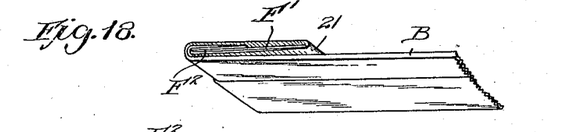
Fig. 18 is a perspective view of the same product.
Figure 19:
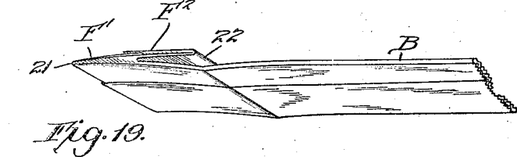
Fig. 19 is a perspective view of the completed bag, illustrative of the last step in the process, the bottom of the bag being unfolded to substantially the same flat plane as the main body of the bag to promote compact packing of the bags in bundles for shipment.
Figure 20:
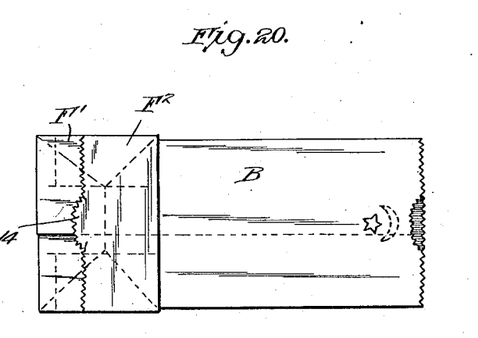
Fig. 20 is a plan view of the same bag in the same unfolded flat condition.
Figure 21:
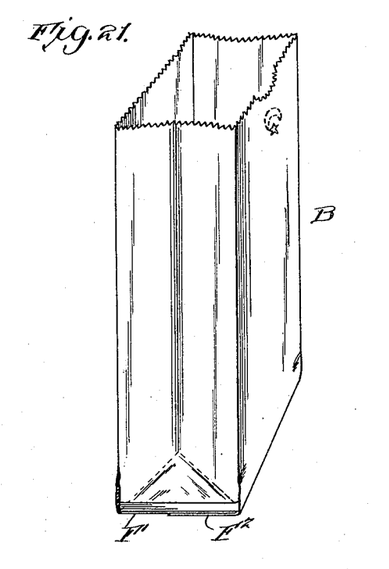
Figs. 21 and 22 are perspective views of the completed bag opened, Fig. 21 showing the bag standing upright, and Fig. 22 showing the bag lying on its side to reveal the square bottom.
Figure 22:
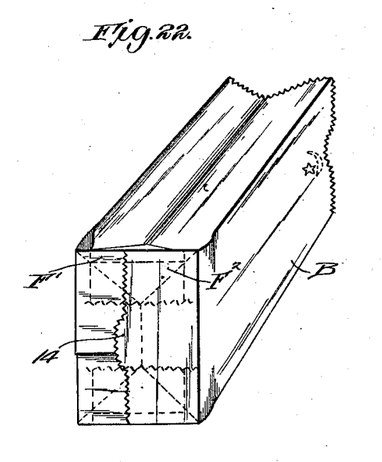

Referring to Figs. 1 to 4, inclusive, in forming the plicated tube T and the bags the first step consists in cutting a series of short longitudinal slits 2 at spaced intervals transversely of the paper while the sheet of paper P is being unwound rapidly from a roll R, and the next step involves the folding of the paper into a plicated tube T so that slits 2 will be located oppositely on the four outer folded edges of the tube. A short irregular or serrated cut 3 is also produced in the flat sheet of paper transversely between the inner or middle pair of slits 2—2, and this serrated cut is preferably made at the same time the slits are formed but not necessarily simultaneously. The purpose of this short serration 3 is to permit the plicated tube to be severed completely across in one wall only in subsequent operations, and at that time the plicated tube is fully formed and the lines of severance extend inwardly at 4—4 from each side edge of the tube. In this incising operation the cuts 4—4 register with the ends of serrated cut 3 thus providing a free flap F² which may be readily turned upward and back upon the top wall of the tube during the forward travel of the plicated tube, while in the meantime the other or bottom wall of the tube will still be joined by an unsevered connecting strip 5 to the next section. The portion of the tube involving strip 5 comprises a double thickness of paper and the pulling strains on the tube are largely centered on this line. The double thickness is produced in folding the sheet of paper into a tubular form and overlapping the border portions. These overlapping portions are pasted together, a line of paste 6 being continuously applied to one border edge of the sheet of paper. The paste may be applied by a roller located above a paste pot situated adjacent a roller around which the paper may be caused to travel after leaving roll R, and the union of the flaps may be effected when the pasted overlapping portions pass between other pressing and feeding rollers. In this connection, reference may be had to my copending application, Serial No. 738,537 for one form of a machine which I have devised for carrying out such a process as herein described.

As the tube is fed and drawn forwardly through such a machine it may be caused to pass between a pair of small and large rollers 7—7' embodying serrated cutting knives 8—8 and a creasing blade 9, the knives serving to cut the plicated sides of the tube for a given distance inwardly at 4—4 as described, both cuts being made simultaneously but not entirely across the tube. The aligned knives in the small roller are spaced apart at a grooved middle part of the roller so that the bottom wall of the tube comprising the pasted overlapping border portions will remain uncut and provide the narrow connecting strip 5.

As hereinbefore stated, the transverse incisions 4—4 in the upper side of the tube are caused to coincide with the serrated cut 3 previously produced in the paper; therefore, the upper side of the tube is cut completely across its full width, and a free flap F² at the top of the tube is the result because such cross cutting of the paper has also been made to register with one end of the longitudinal slits 2—2 in the outer folded edges of the tube.

The tube now passes onward between rollers 7—7' and the creasing blade 9 scores the tube transversely at the opposite or base end of the border slit 2 to permit the severed parts of the tube to be readily opened or spread apart at their free ends, especially if intercepted during the forward travel of the tube as it is drawn through the aforesaid rollers by other rollers lying in a lower plane opposite large roller 7'. The pull on the bottom wall of the tube is preferably directed downwardly to cause this part of the tube to follow the curved circumference of large roller 7', but the inner plicated side-folds 10—10 of the tube travel horizontally on a straight line into an intercepting wiping plate W having transverse slots 11—11 adapted to receive the plicated folds and formed with angularly-related wing portions 12—12 adapted to wipe the plicated folds flat under the pull on the tube and while the upper severed flap F² is curling upwardly in the direction of rotation of the smaller roll. In this movement the short serrated tab 14 on the top flap of the tube occupies the central groove 15 in small roller 7 and is caught between the opposed inner ends of the serrated knives 8—8, and as a result the top and bottom walls of the tube are pulled apart while the plicated folds are passing forward into the slotted intercepting plate and are being wiped flat by engagement with the inclined edges and faces of wings 12—12. Triangular folds F—F are thereby produced in the plicated folds, the diagonal fold lines extending from the outer fold lines of the tube at the opposite ends of the border edge slits 2—2 to the inner fold line of plicated portions 10 where intersected by the transverse crease line 9' in the top wall of the tube. An overhanging finger 16 releases tab 14 from the corners of knives 8—8, and the tube is then entirely free to travel downward and forward between other feed rollers and in so doing compress the soft transverse fold and the diagonal folds on sharply defined lines. From this point of travel of the tube onward the top flap $F^2$ lies flat against the upper wall of the tube, and parts of the former plicated folds extend from the triangular folds beyond each longitudinal side edge of the tube and provide the side flaps $F^3$ which later on are folded inwardly to form an inner sealing part of the flat bottom of the bag.

Thus, one of the next steps in operations consists in folding the side flaps inwardly and flat upon the triangular folded portions while the tube is traveling at high speed, but before this is done the tube passes between paste transferring rollers which apply four parallel straight bands of paste 18 and 19 of different length to the unfolded parts of the tube parallel with the border edges, and another cross strip of paste 20 on flap $F^2$ in the area between the longitudinal bands, or this cross strip may extend the full width of the flap. Thus, after the paste is applied the tube is drawn over into engagement with any suitable device adapted to turn the side flaps $F^3$ inwardly and down upon the pasted triangular folded part of the same flaps. In the machine which I have referred to, these blades overlie the borders of the tube and have rounded edges to intercept and engage the side flaps and turn them inward as the tube is drawn forward, and these blades are also inclined horizontally to gradually press the side flaps of the tube down upon the pasted faces.

Then as the tube travels onward it passes between a pair of rollers adapted to press the flap lightly upon the pasted portion. One of these rollers embodies a creasing blade adapted to score or crease the bottom side of the tube transversely on a straight line 21 across one edge portion of the inturned side flaps, and this roller also carries a cutter adapted to sever short strip 5 connecting this section of a tube with the bag section in advance thereof. Strip 5 is first severed and then the creasing takes place, which flexes the part just severed upwardly. This part provides a bottom flap F' adapted to be folded back upon inturned side folds F—F, and this folding may be brought about by intercepting the forward movement of the flexed part or flap while the main body of the tube travels onward. A suitable device for that purpose may be a plate stationed in the path of the tube, the plate having a slot to permit the body of the tube to travel therethrough while the flexed part is folding backward.

The end of the tube is now folded and the folds may be set by pressing the pasted face of the flap down upon the inturned side flaps. A set of rollers may be used for this purpose and one of these rollers may embody a creasing blade to score the tube transversely across the uncovered part of the inturned flaps, thereby producing another fold line 22 and developing a final bottom fold line in the bag. In creasing the bag in this way the partly folded and pasted bottom of the tube may be caused to flex upwardly as it issues from said rollers, thereby permitting it to be projected into any suitable device adapted to retard its forward movement while the main body of the bag is caused to travel onward between other rolls. As this occurs the folded end of the bag will buckle where creased or scored and double itself upon the pasted surface of free flap $F^2$, thus completing the final fold. The bag B is practically finished when discharged from the rolls in the condition last described, but to facilitate packing and shipping the bottom of the bag which has been doubled back upon the body of the bag is unfolded immediately upon its discharge from said rolls. This result may be accomplished by delivering the bag upon a moving conveyor or belt opposite a second and more rapidly moving belt so that as the doubled part of the bag springs open or apart when released by the discharge roll the second belt will wipe it fully open and free the bag onward in a flat condition to its destination where the bags are piled and wrapped in bundles for shipment and sale. The folds of the bag are for the most part soft folds until discharged to the travelling belts which may be arranged to compress the folds still more while the paste sets or when less apt to spread and escape from between the folds.

By practicing the steps of a process as described, it is feasible to form the tube and bag wholly by stationary and rotary parts, and without the use of oscillating or reciprocable mechanism from the beginning until the end of the operation. Therefore, the travel of the paper and the folding and forming operations may proceed at high speed, and this desirable result is further facilitated by slitting the paper before forming the plicated tube and producing the triangular folds in the tube with the use of a stationary intercepting device as described herein.

What I claim, is:

1. A process of making paper bags, comprising the steps of forming four parallel slits in a flat strip of paper and then forming a plicated tube and partly severing the same transversely at said slits to produce a series of connected bag sections; and in forming triangular folds in the partly severed plicated portions of each section.

2. A process of making paper bags, comprising the steps of drawing a plicated tube having partly severed portions through a stationary intercepting and folding device and forming triangular folds in the partly-severed plicated portions of the tube by sliding engagement of the tube with said device.

3. A process of continually making paper bags from a strip of paper, consisting in first slitting the strip of paper at spaced intervals; then folding said slitted strip into a plicated tube; in partly severing the same transversely to said slits in forming triangular folds in the slitted area of the plicated tube; and in pasting and folding portions of said tube over said triangular folds to form a flat bag bottom.

4. A process of continually making paper bags from a strip of paper, consisting in forming a plicated tube having parallel border slits at intervals in the fold lines thereof; in incising said tube transversely at the border slits; in spreading the walls of the tube apart where incised while causing the tube to travel forwardly; and in wiping the plicated folds flat where slitted and incised to produce triangular folds in applying an adhesive parallel and close to the border edges over the whole length of the folded parts of the tube and in folding the areas contiguous to the triangular folds and the bottom and top parts of the tube subsequently and sealing the same.

5. A process of making paper bags, comprising the steps of forming a tube having plicated sides and slits in the fold lines thereof; in cutting said tube transversely entirely across one wall thereof and partly across the opposite wall; in forming triangular folds in the plicated sides where cut and slitted by drawing the tube through a stationary wiping device to provide a partly developed bag bottom; and in subsequently folding the remainder of the stock upon said triangular folds to complete said bottom.

6. A process of making paper bags, comprising the steps of forming parallel slits in a sheet of paper and a transverse cut between a pair of slits; in subsequently folding the slitted sheet of paper in line with said parallel slits into a plicated tube; in incising the tube transversely where slitted and cut; in forming triangular folds in the plicated portions of the tube where slitted and cut; and in folding the areas contiguous to the triangular folds in sealed positions with and upon such folds.

7. A process of making paper bags, comprising the step of slitting a sheet of paper in parallel places longitudinally of the sheet and cutting an opening between parallel slits; in forming a plicated tube from said sheet and developing the fold lines of said tube to coincide with said slits; in incising the tube transversely to register with said slits and the opening therebetween; in causing the cut walls of the tube to travel on diverging lines for an interval while wiping the slitted plicated sides of the tube flat and forming triangular folds therein; and in folding the areas contiguous to the cut edges of the tube upon the triangular folds and sealing the same with an adhesive.

8. A process of making paper bags, consisting in slitting a sheet of paper in four parallel places at spaced intervals as it is being rapidly unrolled; in forming a plicated tube from the slitted sheet of paper with the slits on the fold lines of the tube; in incising the slitted tube and forming triangular folds and a partially developed flat bottom successively at intervals in the tube without severing the developed sections completely from each other while the tube is traveling at high speed; in pasting and folding each developed bag bottom contemporaneously with the severing of a completed bag section from the tube.

9. A process of making paper bags, consisting in slitting a sheet of paper at spaced intervals as it is being rapidly unrolled; in forming a plicated tube from the slitted sheet of paper with the slits on the fold lines of the tube; in incising the slitted tube and forming triangular folds and a partially developed flat bottom successively at intervals in the tube without severing the developed section completely from each other while the tube is traveling at high speed; in pasting and folding each developed bag bottom in severing the completed bag section from the tube; in doubling the bag bottom upon the body of the bag to complete a final fold; and in unfolding and flattening the completed bag.

10. A process of making paper bags from a strip of paper comprising the steps substantially as herein described of producing a series of longitudinal slits in the strip of paper, forming a plicated tube from said slitted paper strip, severing said tube successively at said slits, and subsequently developing triangular folds in the plicated portions of the tube.

In testimony whereof I affix my signature.

DANIEL APPEL.